United States Patent [19]

Kobayashi et al.

[11] 4,103,908
[45] Aug. 1, 1978

[54] SEAL STRUCTURES FOR ROTARY REGENERATIVE HEAT EXCHANGERS OF GAS TURBINE ENGINES

[75] Inventors: Osamu Kobayashi, Yokohama; Ikuo Nakamura; Akira Shimozono, both of Yokosuka, all of Japan

[73] Assignee: Nissan Motor Company, Limited, Japan

[21] Appl. No.: 713,963

[22] Filed: Aug. 12, 1976

[30] Foreign Application Priority Data

Aug. 26, 1975 [JP] Japan .............................. 50-103281

[51] Int. Cl.² .............................................. F16J 15/34
[52] U.S. Cl. ........................................ 277/96.2; 165/9
[58] Field of Search .................. 165/9; 277/96, 96.1, 277/96.2

[56] References Cited

U.S. PATENT DOCUMENTS

| | | | |
|---|---|---|---|
| 3,743,008 | 7/1973 | Zeek et al. | 277/96.2 |
| 3,923,667 | 12/1975 | Lachman | 165/9 |

Primary Examiner—Robert I. Smith
Attorney, Agent, or Firm—Robert E. Burns; Emmanuel J. Lobato; Bruce L. Adams

[57] ABSTRACT

A hot side seal in rubbing contact with a rotary regenerator matrix of a gas turbine engine consists of an annular portion formed from a carbon block and a diametral portion, the rubbing surface of which is made from a layer of a compound of nickel oxide and calcium fluoride.

2 Claims, 8 Drawing Figures

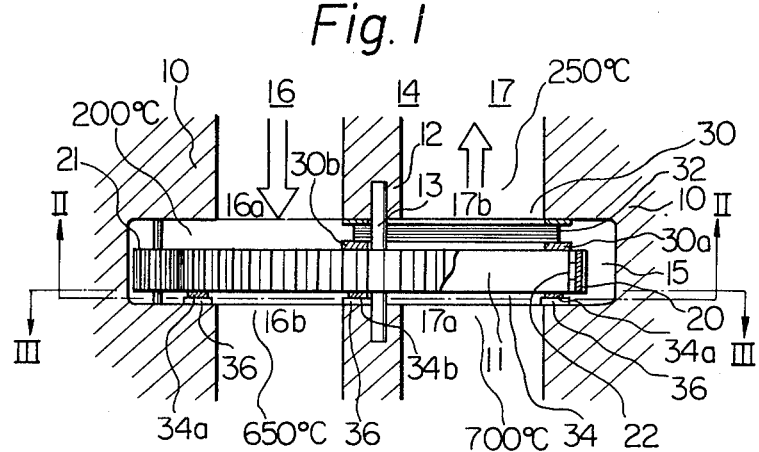
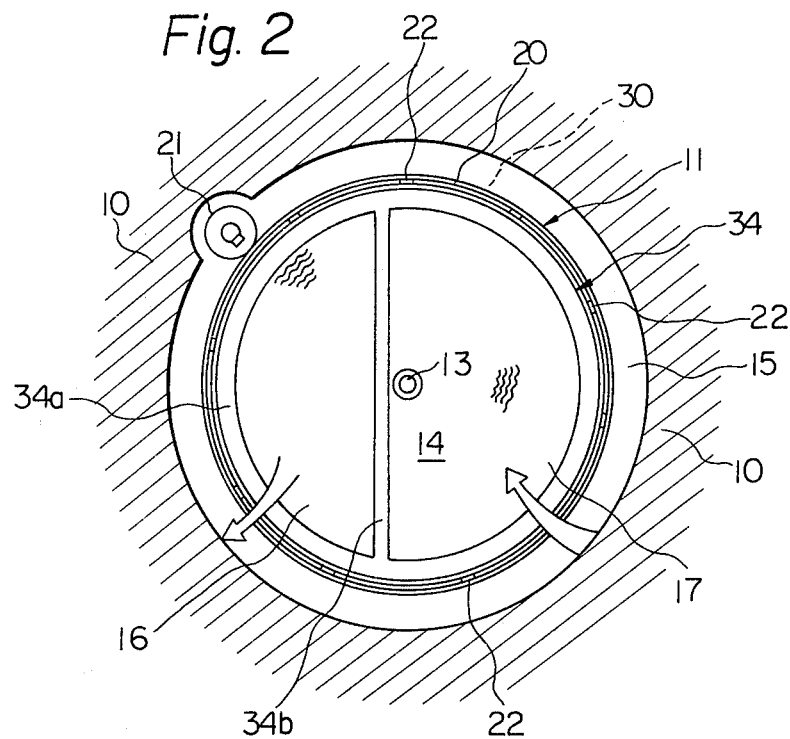

SEAL STRUCTURES FOR ROTARY REGENERATIVE HEAT EXCHANGERS OF GAS TURBINE ENGINES

BACKGROUND OF THE INVENTION

This invention relates generally to rotary regenerative heat exchangers employed in gas turbine engines and in particular to rubbing seal structures for applying to such heat exchangers.

Since such a sealing device is exposed to extremely high temperatures, it is a usual practice that the seal is formed from a heat-refractory material such as nickel oxide coating on a suitable metal base plate. The coating of such material is formed on the entire surface area rubbing against the rotary regenerator. Consequently, nickel oxide worn off in a finely particled state is emitted to the engine exhaust gases passing through the regenerator outlet passage. This will very likely cause a health hazard as gas turbine engines tend to be more and more widely employed.

SUMMARY OF THE INVENTION

It is therefore an object of this invention to provide a seal structure of a rotary regenerative heat exchanger which is harmless and sufficiently heat-refractory.

It is another object of this invention to minimize the use of nickel oxide or the like in the rubbing seal material.

It is still another object of this invention to provide a variety of sealing structures of the aforementioned type, any of which meets the abovementioned objects.

According to one feature of this invention, while innocuous carbon block is employed for an annular portion of the seal which is exposed to a relatively low temperature, the rubbing surface of a diametral portion of the seal is formed from a layer of compound of nickel oxide and calcium fluoride to withstand higher temperature.

BRIEF SUMMARY OF THE DRAWINGS

Other objects, features and advantages achieved by this invention will be better understood as the invention is explained below in full detail, with reference to the accompanying drawings, in which:

FIG. 1 is an elevation partially in section of a rotary regenerative heat exchanger with a seal structure;

FIG. 2 is a view in section taken along line II—II of FIG. 1;

DESCRIPTION OF THE PREFERRED EMBODIMENTS

Figure 3:
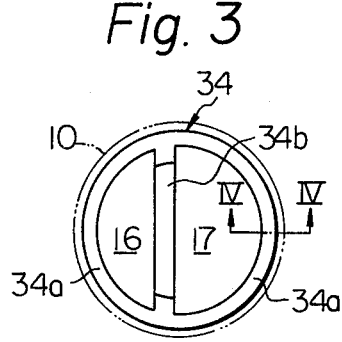
FIG. 3 is a view in section taken along line III—III of FIG. 2 showing a preferred embodiment of this invention.
Figure 4:
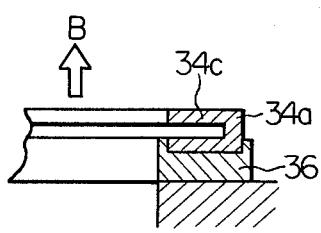
FIG. 4 is a section taken along line IV—IV of FIG. 3.

FIGS. 1 and 2 generally show schematically a disc-type rotary regenerator portion of a gas turbine engine (not shown). The regenerator comprises a housing 10 which is generally drum-shaped and which encloses a regenerator core or an annular matrix 11 of any conventional construction. A shaft 13 born in a partition wall 12 of the housing rotatably carries the core 11. A generally cylindrical space 14 is defined within the interior of the core and an annular space 15 extends around the periphery of the core 11 within the housing. In the annular space, an externally toothed ring 20 concentrically surrounds the core 11 and engages the same directly or through resilient pads 22. The ring 20 meshes with a pinion 21 which is driven by a turbine of the engine (not shown) to drive the ring together with the core.

The partition wall separates the space 14 into two sectoral spaces forming gas flow passages 16 and 17. One passage has an inlet 16a for cold, high pressure air entering one face of the housing and opposite to it an outlet 16b for the heated compressed air. The hot, low pressure exhaust gases enter through an inlet 17a of the passage 17 and leave the regenerator through an outlet 17b, the two streams thus being in counter-flow relation.

A seal is provided between each radial face of the core and the housing in rubbing contact with the rotating core to confine the cold and hot gases to the desired passages through the core from inlet to outlet and thereby minimize leakage between the passages. A seal 30 on the outboard or cold side of the core, which is subject to about 200° to 250° C, essentially consists of an arc portion 30a in contact with the semi-circular peripheral portion of the core and a diametral portion 30b in contact with substantially central portion of the core 11 to discommunicate the annular space 15 and the passage 16 from the passage 17. The seal is supported by a metal bellows 32 as is conventional.

The seal member 34 on the inboard or hot side of the core is comprised of an annular portion 34a in contact with the substantially entire periphery of the core and a diametral portion 34b bridged between the opposite points of the annular portion. The both portions are supported on a holder 36. Thus, gas tightness is achieved between the annular space 15 and the respective passages 16, 17 and between these passages.

Owing to the rotary movement of the core 11, the heat removed from the hot exhaust gases is transferred to the cold inlet compressed air to heat the same. The radial face of the core on the outboard side is exposed to relatively low temperatures, such as about 200° C at the inlet of the compressed air passage and about 250° C at the outlet of the exhaust gas passage, while the radial face of the core on the inboard side is exposed to higher temperatures, such as 650° C at the outlet of the passage and 700° C at the inlet of the passage. Accordingly, a highly heat-refractory material is desired particularly for the seal applied to the inboard side of the core. The seal surface, which is in rubbing contact with the core is conventionally made of a layer consisting of a compound of nickel oxide and calcium fluoride spray-coated or sintered on a metal substrate. Calcium fluoride is employed particularly because of its excellent lubricity at a higher temperature. Although such seal material has an advantage of high heat-resistance, it has shortcomings in that, as briefly mentioned, the nickel oxide worn during rubbing against the core is emitted into the atmosphere together with the exhaust gases. Besides, such material is more expensive than other materials of lower heat resistance such as carbon.

This invention provides a solution to this problem by constituting the seal on the inboard side of the core by two different materials, one being refractory to a higher temperature such as nickel oxide and the other to a lower temperature but containing no toxic component.

FIGS. 3 to 8 illustrate an inboard or hot side seal 34 according to a preferred embodiment of this invention, and several alternatives constructions. In FIG. 3, while the annular portion 34a is made of carbon block, the diametral portion 34b is of a layer consisting of a compound of nickel oxide and calcium fluoride coated on a base plate of metal such as stainless steel. It is recognized in the experiments conducted by us that the annular portion is not subjected to so high temperature as the diametral portion on which heat is concentrically applied. Thus the carbon block or equivalent enough withstand the heat applied to this portion of the seal. On the other hand, the annular portion more severely wears than the diametral portion. However, since carbon hardly influences the human health and accordingly the dust particles of the worn-out carbon, if admixed into the exhaust gases, would not cause any appreciable problem.

The nickel oxide layer is suitable for the diametral portion which is subject to higher temperature but less rubbing contact. Thus, the seal structure according to this invention meets the both requirements of withstanding a high temperature and of eliminating a possible health hazard. It is apparent that the seal according to this invention is cheaper than the seal consisting of nickel oxide layer alone. For more efficient heat resistance at the annular portion of carbon block, the portion carried by a holder 36 is provided with an inner radial groove 34c terminating short of the peripheral edge thereof, which assists dissipation of heat energy by enlarging the surface area subjected to the heat.

Figure 5:
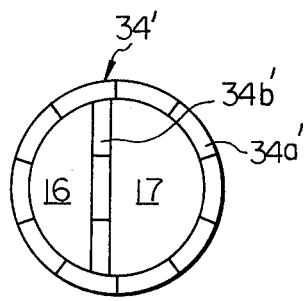
FIG. 5 is a view similar to FIG. 3 showing another design alternative to FIG. 3 structure.
Figure 6:
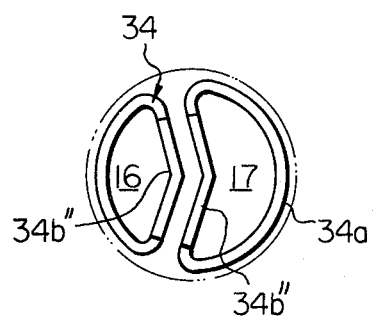
FIG. 6 is a view similar to FIG. 3 showing still another design alternative to FIG. 3 structure.

FIG. 5 shows a construction example in which both the annular portion 34a' and the diametral portion 34b' are segmented into multiple sectors for enhanced gas tightness. According to FIG. 6, the diametral portion 34b'' is divided into a section on the side of the compressed air passage 16 and a section on the side of exhaust gas passage 17. Both the sections are applied with the coating of nickel oxide and calcium fluoride according to this invention.

Figure 7:
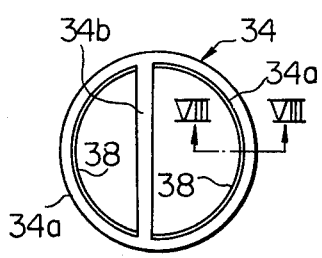
FIG. 7 is a view similar to FIG. 4 showing a further design alternative to FIG. 3 structure.
Figure 8:
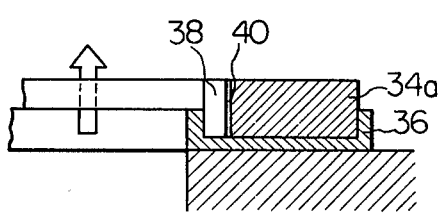
FIG. 8 is a section taken along line VIII—VIII of FIG. 7.

In FIGS. 7 and 8, a layer 38 of nickel oxide and calcium fluoride is provided in direct contact with or at a small clearance from the inner peripheral wall of the annular portion 34a of carbon block. Thus, the carbon block is protected from direct exposure to hot gases, resulting in its elongated life. The thickness of the layer 38 is preferably third to fifth of the total thickness of the annular portion. A small clearance between the inner wall of the annular portion and the layer gives heat-isolation effect. Preferaly, several circumferentially spaced adhesives 40 may be filled into the small clearance to securely connect the layer 38 to the carbon block 34a. The carbon block with layer 38 is fitted within a groove (no numeral) formed on the holder 36. Of course, the diametral portion also in this example is made of nickel oxide and calcium fluoride layer. The amount of nickel oxide employed in this example is yet enough smaller than that employed in a conventional structure in which the seal is entirely made of nickel oxide layer.

What is claimed is:

1. In a gas turbine engine, a rubbing seal for engagement with a hot face of a matrix of a rotary regenerative heat exchanger, comprising an annular portion made from carbon block, a diametrical portion having a rubbing contact surface made of a compound of nickel and calcium fluoride, and a layer of a compound of nickel oxide and calcium fluoride formed on an inner circumferential wall of the annular portion.

2. A rubbing seal as claimed in claim 1, in which a small clearance is defined between said layer and said inner circumferential wall of the annular portion.

* * * * *